June 13, 1950     A. C. MAYER ET AL     2,511,358

PIPE SEVERING DEVICE

Filed April 15, 1946

INVENTORS
ALBERT C. MAYER
JOSEPH J. BLACKMORE
BY
Robert B. Terry
ATTORNEY

Patented June 13, 1950

2,511,358

UNITED STATES PATENT OFFICE 2,511,358

PIPE SEVERING DEVICE

Albert C. Mayer, St. Louis, Mo., and Joseph J. Blackmore, Edwardsville, Ill.

Application April 15, 1946, Serial No. 662,342

5 Claims. (Cl. 30—102)

1

This invention relates to improvements in pipe severing devices, and more particularly to improvements in pipe cutters and cutting wheels particularly designed for the severance of lengths of tubing to be joined, as by welding, into virtually continuous lengths.

Prevalent types of pipe cutters usually employ a cutting wheel or roller opposite which are disposed a pair of pipe supporting rollers or wheels forming a rolling abutment for that region of the pipe acted upon by the cutter. The arrangement briefly referred to prevails in the line of manually operated pipe cutters, and is also sometimes employed in somewhat larger power-operated pipe cutting equipment utilized in the shop, rather than in the field. Cutting equipment of the type briefly referred to is subject to a serious shortcoming or defect, in that the action of the usual so-called cutter serves to displace or deform at least a substantial portion of the metal adjacent the severed pipe ends, in a direction distinctly inwardly of the pipe. It results from this that when such a severed length of pipe or tubing is joined to a companion length, the internal diameter of the pipe at the joint is seriously effectively reduced, with obvious bad results and unpredictable effects on capacity of the tubing. It is accordingly a major object of the present invention to provide a rotary pipe cutter of such design as to assure against internal burring or other localized impairment of pipe capacity in the region of the cut.

Yet another object of the invention is attained in an improved pipe cutter and particularly pipe cutting wheel which will, besides effecting the object of severance, serve in an improved way, to condition the end or ends of the pipe for welding.

A still further and important objective is obtained in an improved welded pipe joint of such nature as to conduce to a greater depth of welding metal than is usually obtained, as in the usual practice of butt welding of steel tubing joints when the tubing is severed by conventional equipment.

Yet an additional and important objective, akin to the foregoing, is realized in a pipe cutting device of such nature as to provide relatively uniform and substantial burrs or ridges adjacent the severed ends of the pipe, and by the same operation, to face off the ends of the pipe at an optimum angle and shape for welding purposes, and thus to provide secure and uniform joints of a cross-section and strength at least equal to,

2 and in most cases exceeding the strength factors of the piping intermediate the joints.

The foregoing and numerous other objects will become more readily apparent from the following detailed description of a presently preferred embodiment of the invention, particularly when considered in connection with the accompanying drawing, in which.

Figure 1:
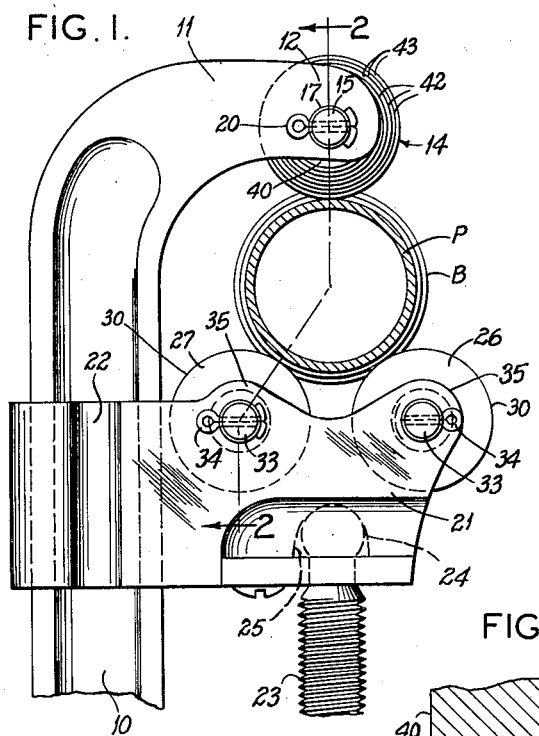
Fig. 1 is a side elevation of the pipe receiving end of a manually operated pipe cutter, showing in section a pipe in position to be severed, and located between the cutter and supporting rolls.

Referring now by characters of reference to the drawing, the cutter selected for illustration and description may include a number of elements of a generally conventional form, such as a handle 10, only a portion of which is shown, and which terminates in an L-shaped end or jaw 11, this jaw being bifurcated or slotted, and the furcations 12 and 13 being spaced to receive therebetween a cutting roll or roller generally indicated at 14.

A readily replaceable pivot mounting of the cutter 14 is provided by a headed pivot pin 15 extended through apertures 16 and 17 in the furcations 13 and 12. A cotter key 20 (Fig. 1) coacts with the head of the pin 15 in preventing its axial displacement.

The opposite jaw 21 is carried by a bracket portion 22, which is freely slidable along the handle 10, yet is so positioned thereby as to assure movement of the jaw 21 along a straight line path parallel to the axis of the handle 10, as will be readily understood. This adjustment is conveniently effected as by movement of an adjustment screw 23, which may be manually actuated and extends in conventional manner through a threaded bore (not shown) formed in a fixed part of handle 10. The screw terminates in a swivel joint identified with ball 24 on the screw, and socket 25, the latter formed in the jaw element 21.

The jaw 21 serves to carry in the example shown, a pair of supporting abutment rollers generally indicated at 26 and 27. Since this pair of rollers may be uniform construction, a description of each will suffice for both.

Figure 4:
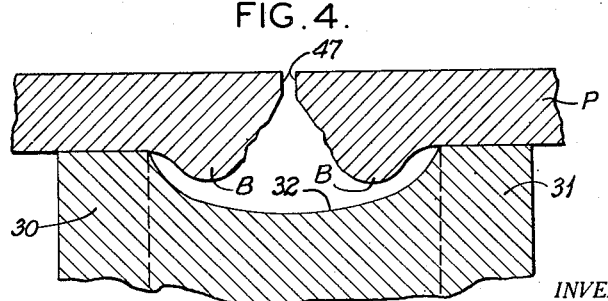
Fig. 4 is a fragmentary sectional view to illustrate the structure and action of one of the supporting rollers on the pipe in the regions on both sides of a zone of severance or cutting.

Each of the supporting rollers is of somewhat greater width, or dimension along its axis, than is usual. Further, each supporting roller is characterized by at least a pair of axially spaced pipe engaging portions of circular section transverse to the roller axis, these portions being of even diameter are indicated at 30 and 31, and best appear in Figs. 2 and 4.

Figure 2:
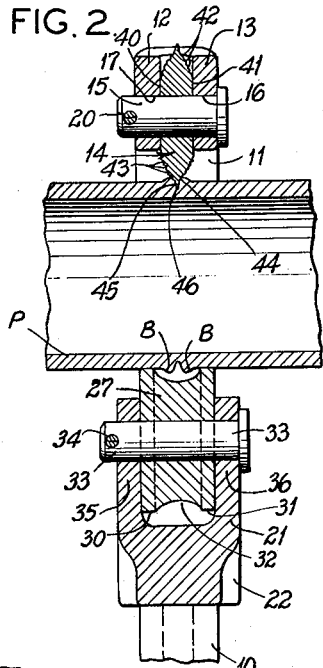
Fig. 2 is a sectional elevation of the arrangement of Fig. 1 as taken along line 2—2 and thereof, and as viewed in the direction of the arrows.

The structure of the roller between the portions 30 and 31 is of lesser importance than the fact of their spacing, but the unit is conveniently formed to provide a central groove 32 which may be of dished aspect in axial section. Each of the rollers 26 and 27 is rotatably supported as by a removable headed pivot pin 33 positioned axially, as by the head and a cotter key 34. The jaw 21, as will be noted, is partly of bifurcated construction to receive and axially position the rollers between the furcations 35 and 36 (Fig. 2).

Figure 3:
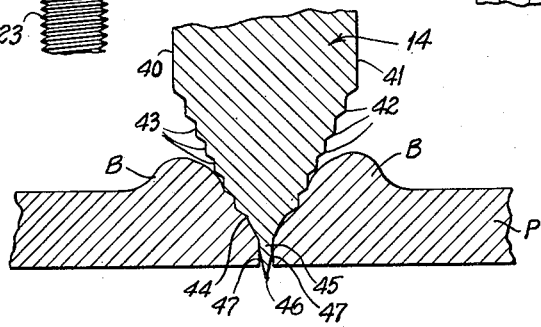
Fig. 3 is a greatly enlarged fragmentary sectional view illustrating the action of the cutting roller upon completion of severance of a length of pipe or tubing.

Proceeding now to describe the structural novelty of the cutter wheel or roller 14, this element is preferably so formed that its portion nearest the axis, and which may be referred to as a hub, is characterized by opposite parallel planer sides 40 and 41. These surfaces work over the inner surfaces of the furcations 12 and 13, and there being provided a reasonable working clearance between the roller and these furcations, the latter will serve reasonably closely to fix the axial position of the cutter. Between the planer surfaces and periphery of the roller, each side thereof between a median plane and the hub portion, is of a generally frusto-conical aspect, being widely divergent from the periphery toward the axis. The angle subtended by the opposite sides of the roller, on each side of its axis, is of the order of 40–60°, and for forming the ends of the severed tubing to provide a welded joint of best characteristics, this angle is preferably within the range of 45–50°. Preferably both of the tapered surfaces are provided with a pattern of projections and intervening relieved portions, the projections being indicated at 42 and the intervened recessed areas shown at 43. In section, as best shown by Fig. 3, the divergent sides of this portion of the wheel are of a special serrated or saw-toothed pattern, and in lateral aspect as the cutter wheel is observed from each side along its axis, the ridges 42 will appear as an annular pattern, as will obviously the relieved or recessed portions 43 (Fig. 1). Each of the ridges 42 is, in section, preferably of asymmetric form, its outermost face being shorter, and lying at a lesser angle to the axis, say 15°–25°, and the innermost face of the ridge being somewhat longer, and characterized by a much greater slope with respect to the axis of the roller. Such an arrangement results in a more definite directional displacement of the metal along the pipe ends in course of severance.

The described projecting and relieved portions serve, as the cutter wheel 14 is rotatated relative to the pipe, to effect a distinctly outward displacement or deformation of the metal of the pipe originally in the region of the cut, and this radial displacement results in the formation of distinct burrs B, one on each side of the cutter wheel. These burrs result from a gradually outward "flow" of the metal originally constituting this portion of the wall of the pipe or tubing P.

It will have been observed particularly from Fig. 3, that the annular projections 42 are not extended outwardly beyond a zone indicated at 44 (Fig. 3), and that radially beyond such zone, the wheel is of a much different degree of taper to result in a reltively thin or narrow section constituting a knife-like cutter element 45 terminating in a knife edge 46. This latter is preferably a true cutting element, and operates to particular advantage during the first penetration of the relatively tougher outer skin of the tubing, but perhaps equally importantly during the final stage of cutting as the edge of the roller first finds its way through the wall of the pipe 3. But for a true incision at the finish of the cutting operation, there would be apt to result an inward deformation resulting in substantial ridges or burrs, interiorly of the zone of severance. Such internal obstruction would result in an effective reduction of the internal diameter of the tubing at the joint, with an obvious bottleneck effect on fluid flow, and with wasteful turbulence, particularly in the flow of liquids. Such effect is practically entirely obviated by the steps of cutting, and the cutting structure heretofore described.

We are aware that certain attempts have heretofore been made to support the pipe during cutting, by rollers which engage the tubing in axially spaced zones. As far as is known, however, pipe rollers of the type referred to have been employed for the purpose of ironing out the burrs or ridges which result from the action of the cutter. Quite contrary to such older practice, it is a present purpose to avoid any deformation of the burrs or ridges B, but rather to utilize them as a convenient expedient for augmenting the depth of the pocket now available as will be apparent from Fig. 4, when paired severed pipe ends are brought into juxtaposition for welding. It will further have appeared that the angle of the divergent metal displacement portion of the roller 14, determines, at least approximately, the angle remaining between the paired opposed pipe ends which have been severed by the cutter of the present design. The relatively thin knife-like cutting periphery further results, as will appear from Figs. 3 and 4, in a pair of substantially planar end faces of the severed pipe ends, these being indicated at 47. The parallelism of these faces enables them either to be brought into direct abutting relation, or evenly spaced apart as desired, prior to joining the severed pipe ends as by welding.

In view of the desirability as just described, for retention and utilization of the burrs or ridges B as a support for, and as walls on opposite sides of an annular pocket of welding metal (not shown) there now becomes more meaningful, the desirability of the axial spacing between the even diameter portions 30 and 31, of the supporting rollers 26 and 27. As will appear from Fig. 2, the axial spacing of the portions 30 and 31, is materially greater than the thickness or depth in an axial direction, of the signicant portions of the roller 14.

The manner of usage and operation of a manual pipe cutter constructed to embody the present improvements, will now have become apparent to those skilled in the art since actual manipulation of the tool will not be, for the most part, different from that of conventional portable pipe cutters. The actual manipulation of the present pipe cutter may however, for completeness, be reviewed as follows: The pipe P is suitably supported in a pipe vise or the like (not shown), the jaw 21 retracted sufficiently to accommodate the pipe between the rollers and jaws, and screw 23 threaded up to bring the supporting rollers 26—27 in firm engagement with one side of the pipe, and with the cutting roller 14 under some pressure against the opposite side. Assuming the pipe to be held stationary, the cutting tool is then bodily rotated about an axis coincident with that of the pipe. Incident to progressive penetration of the pipe wall by the cutter, the cutter is fed into the pipe at increasing depths by gradually threading up the screw 23. The finish of this operation is, however, by way of some departure from usual practice, conducted with only a light pressure through the screw 23, whereby to obviate to the fullest extent possible, any inward deformation of the pipe wall in the region of the cut.

Although the invention has been described by referring specifically to the elements and functions of a single preferred embodiment, because of the many possibilities of varying the structure without departure from the principles thereof, the detail of description should be taken in an instructive rather than in any limiting sense.

We claim as our invention:

1. A cutting wheel for use in a pipe cutter or the like, and consisting of a circular, revolvable, disc-like member provided with a saw tooth pattern of closely spaced projections and intervening relieved portions on a lateral surface of the wheel and arranged as the wheel is rotated, to displace the metal of the pipe in the region of the cutter, toward the periphery of the pipe being severed, the wheel being provided outwardly of its said patterned portion, with a relatively thin knife-like peripheral rim, terminating in a cutting edge.

2. A rotary pipe serving element consisting of a wheel-like member provided with a plurality of closely spaced annular and concentric ridges of V-shape section on each of its opposite sides, the ridges being so formed to displace the metal outwardly of the pipe wall, and the element further being provided with a knife-like periphery of a section which is narrow in a dimension parallel to the axis of the cutter, and formed with substantially parallel sides, the severing member including a hub portion with planar sides, and the annular V-shape ridges substantially covering the sides of the severing member between the hub portion and the knife-like periphery.

3. In a pipe cutter, companion jaws between which the pipe is disposed for severance, a rotary cutter and pipe positioning roller elements carried by opposite jaws, the jaw and pipe being arranged for relative rotation incident to rolling engagement of the pipe by the cutter for pipe severance, the positioning roller elements engaging the pipe, being characterized by pipe-engaging portions of even diameter, one at each side of the pipe portion being severed, the even diameter portions being spaced from each other a distance axially of the pipe, substantially greater than the thickness of the rotary cutter, and such as to avoid their engagement with any burrs or ridges resulting from the operation of the cutter.

4. In a pipe cutter assembly, a pair of spaced rollers between which a length of pipe is disposed and arranged for severance by relative rotation of the pipe and rollers, one of the rollers consisting of a pipe cutting wheel which is annularly corrugated on its lateral surfaces from a hub region outwardly to a zone just inward of the periphery, the corrugations consisting of a series of closely spaced, substantially annular ridges each with a distinct outer edge, with intervening relieved portions on its lateral surfaces, and the wheel having a peripheral cutting edge, the companion roller being formed and dimensioned to provide spaced rolling abutments for the pipe during severance, with a portion of reduced diameter between said abutments, the axial spacing of the abutments substantially exceeding the greatest width or thickness of the cutting wheel, whereby the abutments engage the pipe only in regions widely axially removed from the annular ridges of the cutter element.

5. In a pipe cutter, a pair of adjustable jaws between which the pipe is received, a frame by which the jaws are carried, a pipe severing roller rotatably mounted on one of said jaws and characterised by a thin knife-like cutting periphery, the sides of the cutting roller being widely divergent inwardly of the cutting edge, the opposite sides subtending an angle of the order of 40–60 degrees, and the lateral surfaces of the angular sides being provided with a plurality of closely spaced serrations or ridges of substantially annular form and intervening depressions or relieved portions, the serrations or ridges each presenting a distinct outermost edge, and the opposite sides of the ridges being differently sloped whereby throughout cutting action of the roller the metal of the pipe adjacent the cut is displaced outwardly of the pipe; a pipe abutment roller carried by the opposite jaw and being of a substantially greater axial dimension than the severing roller, the abutment roller having a central portion of materially reduced diameter, and pipe-engaging portions of uniform diameter, one at each side of the reduced portion, the uniform diameter portions being spaced from each other an axial distance materially greater than the thickness of the severing roller and sufficiently to avoid their engagement with any ridges or burrs formed along the zone of pipe severance as a result of the action of the severing roller.

ALBERT C. MAYER.
JOSEPH J. BLACKMORE.

REFERENCES CITED

The following references are of record in the file of this patent:

UNITED STATES PATENTS

| Number | Name | Date |
| --- | --- | --- |
| 922,111 | Eck | May 18, 1909 |
| 1,681,807 | Kenerson | Aug. 21, 1928 |
| 1,207,339 | Stratton | Dec. 5, 1916 |